US008983276B2

(12) United States Patent
Kuo

(10) Patent No.: US 8,983,276 B2
(45) Date of Patent: Mar. 17, 2015

(54) APPARATUS AND METHOD FOR TEMPORARY STORAGE OF IMAGE-ENCODING DATA

(75) Inventor: Tzu-Yun Kuo, Taoyuan County (TW)

(73) Assignee: Alpha Imaging Technology Corp., Jhubei (TW)

( * ) Notice: Subject to any disclaimer, the term of this patent is extended or adjusted under 35 U.S.C. 154(b) by 321 days.

(21) Appl. No.: 13/032,749

(22) Filed: Feb. 23, 2011

(65) Prior Publication Data

US 2012/0063748 A1 Mar. 15, 2012

(30) Foreign Application Priority Data

Sep. 9, 2010 (TW) .............................. 99130506 A

(51) Int. Cl.
*H04N 5/917* (2006.01)
*H04N 19/426* (2014.01)

(52) U.S. Cl.
CPC .................................. *H04N 19/427* (2013.01)
USPC ...................................... 386/328; 348/231.1

(58) Field of Classification Search
CPC .............. G06T 1/20; G06T 1/60; G11C 7/10
USPC .............................. 386/328, E5.007; 348/231
See application file for complete search history.

(56) References Cited

U.S. PATENT DOCUMENTS

| 5,870,151 | A | * | 2/1999 | Korber | 348/553 |
| 6,061,471 | A | * | 5/2000 | Coleman, Jr. | 382/173 |
| 7,532,760 | B2 | | 5/2009 | Kaplinsky et al. | |
| 2003/0063674 | A1 | * | 4/2003 | Tapson | 375/240.19 |
| 2004/0226035 | A1 | * | 11/2004 | Hauser, Jr. | 725/9 |
| 2006/0007353 | A1 | * | 1/2006 | Matsutani et al. | 348/441 |
| 2010/0033581 | A1 | * | 2/2010 | Mollov | 348/207.1 |

FOREIGN PATENT DOCUMENTS

| CN | 1525336 A | 9/2004 |
| CN | 101212674 A | 7/2008 |

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

An apparatus and a method for temporary storage of image-encoding data are provided. The apparatus for temporary storage of image-encoding data is utilized for high-resolution image encoding, wherein the apparatus includes an image sensing unit, a storage unit, and an encoding unit. The image sensing unit creates a plurality of frame data in successive order. Each frame data is composed of a plurality of macroblock row data. The storage unit includes a first storage portion and a second storage portion. The capacities of the first storage portion and the second storage portion are both a positive integral multiple of the size of the macroblock row data. The storage unit receives the macroblock row data from the image sensing unit and writes the macroblock row data into one of the first storage portion and the second storage portion. When the encoding unit reads the written macroblock row data from one of the first storage portion and the second storage portion, the storage unit simultaneously receives new macroblock row data from the image sensing unit and writes the new macroblock row data to the other one of the first storage portion and the second storage portion. The design of the first storage portion and the second storage portion is utilized to conserve storage space.

8 Claims, 5 Drawing Sheets

APPARATUS AND METHOD FOR TEMPORARY STORAGE OF IMAGE-ENCODING DATA

BACKGROUND OF THE INVENTION

1. Field of the Invention

The present invention relates generally to an apparatus and a method for temporary storage device of image-encoding data. Particularly, the present invention relates to an apparatus and a method for temporary storage of image-encoding data that utilize two temporary data storages with macroblock row sizes as the storage size basis.

2. Description of the Prior Art

As digital cameras, webcams, and other related digital imaging devices become more widespread, consumer demand for digital devices with higher resolution quality has also increased. Fierce market competition has made price a key factor in determining the potential competitiveness of each such related products. Besides purely light sensing hardware devices and other related light sensing electronic components, image encoding associated with hardware and software has also become a core technology of digital imaging devices.

As consumer demands for imaging resolution become increasingly stringent, technology and related skills for high resolution image encoding have become a focal point of concern for consumers. FIG. 1 is a schematic diagram of a conventional image encoding system. As shown in FIG. 1, in the conventional image encoding system, the sensing device 1 converts detected light signals into electronic signals with frame units. Each frame (referred to as current frame) is written into a temporary storage device 2 to be read by an encoding device 3, wherein the temporary storage device 2 may be a Dynamic Random Access Memory (DRAM) or any other type of storage device. The encoding device 3 reads and encodes from the temporary storage device 2 the frames into a digital image data corresponding to a specific format (e.g. H.264). The sensing device and the encoding device alternately read from and write into the two temporary storage devices (referred to as ping pong temporary storage devices), wherein each temporary storage device has a capacity equal to the size of one frame.

However, as resolution quality increases, the size of each frame has also increased to exceed the Megabyte size threshold. As a result, the conventional image encoding system would have to accordingly have a pair of correspondingly large temporary storage devices. On one hand, more temporary storage space and hardware resources of related electronic addressing circuits would be required, while on the other hand, even more time would be wasted to read from and write into the temporary storage devices.

SUMMARY OF THE INVENTION

It is an object of the present invention to provide an apparatus and a method for temporary storage of image-encoding data. In comparison to the prior art, the apparatus for temporary storage of image-encoding data requires less hardware resources such as temporary storage devices and related addressing circuits in order to save time on the read and write procedures of the temporary storage device.

The present invention achieves the mentioned objectives by providing an apparatus for temporary storage of image-encoding data for use with a high resolution image encoder. The apparatus includes an image sensing unit, a storage unit, and an encoding unit. The image sensing unit creates successive multiples of frame data, wherein each frame data is composed of multiple macroblock row data. The storage unit, consisting of at least two storage portions, reads from the image sensing unit the individual macroblock row data and writes the macroblock row data to one of the storage portions, wherein the size of each storage portion is a positive integral multiple of the macroblock row data. The encoding unit reads the written macroblock row data in one of the data storage portions of the storage unit, wherein the storage unit simultaneously continues to receive the macroblock row data from the image sensing unit and writes the macroblock row data to the other storage portion of the storage unit. The storage portions of the storage unit have storage capacities proportional to a multiple factor of the macroblock row data size to achieve the effect of saving space.

The method for temporary storage of image-encoding data for use in high resolution image encoding consists of the following steps. The first step involves receiving a macroblock row data from the image sensing unit, wherein the image sensing unit creates a plurality of frame data in successive order with each individual frame data being composed of a plurality of macroblock row data. The macroblock row data is then written into either a first storage portion or a second storage portion of the storage unit, wherein the storage capacities of the first storage portion as well as the second storage portion are identical to the size of the macroblock row data. Next, an encoding unit is utilized to read the written macroblock row data from either the first storage portion or the second storage portion. While the encoding unit is reading the written macroblock row data, new macroblock row data is simultaneously received from the image sensing unit and then written into the other one of the first storage portion and the second storage portion. The process of the encoding unit reading and writing new macroblock row data is then repeated thereafter. The method for temporary storage of image-encoding data of the present invention utilizes storage portions that are proportional in size to a positive integral multiple of the macroblock row data size in order to achieve the effect of conserving storage space.

DETAILED DESCRIPTION OF THE PREFERRED EMBODIMENT

The present invention provides an apparatus and a method for temporary storage of image-encoding data. In a preferred embodiment of the present invention, the apparatus and the method for temporary storage of image encoding data are utilized for high-resolution image encoding. However, in other embodiments, the present invention may be utilized in non high-resolution image encoding.

Figure 1:
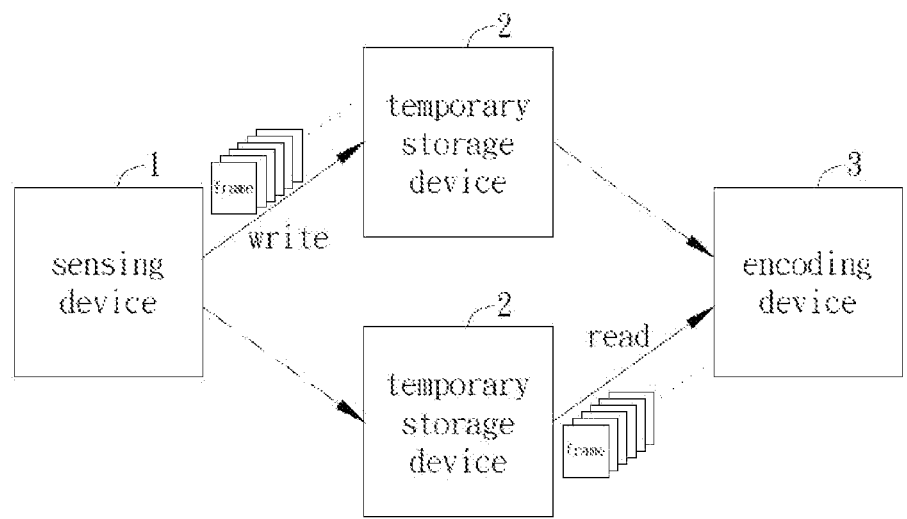
FIG. 1 is a schematic diagram of a conventional image encoding system.
Figure 2A:
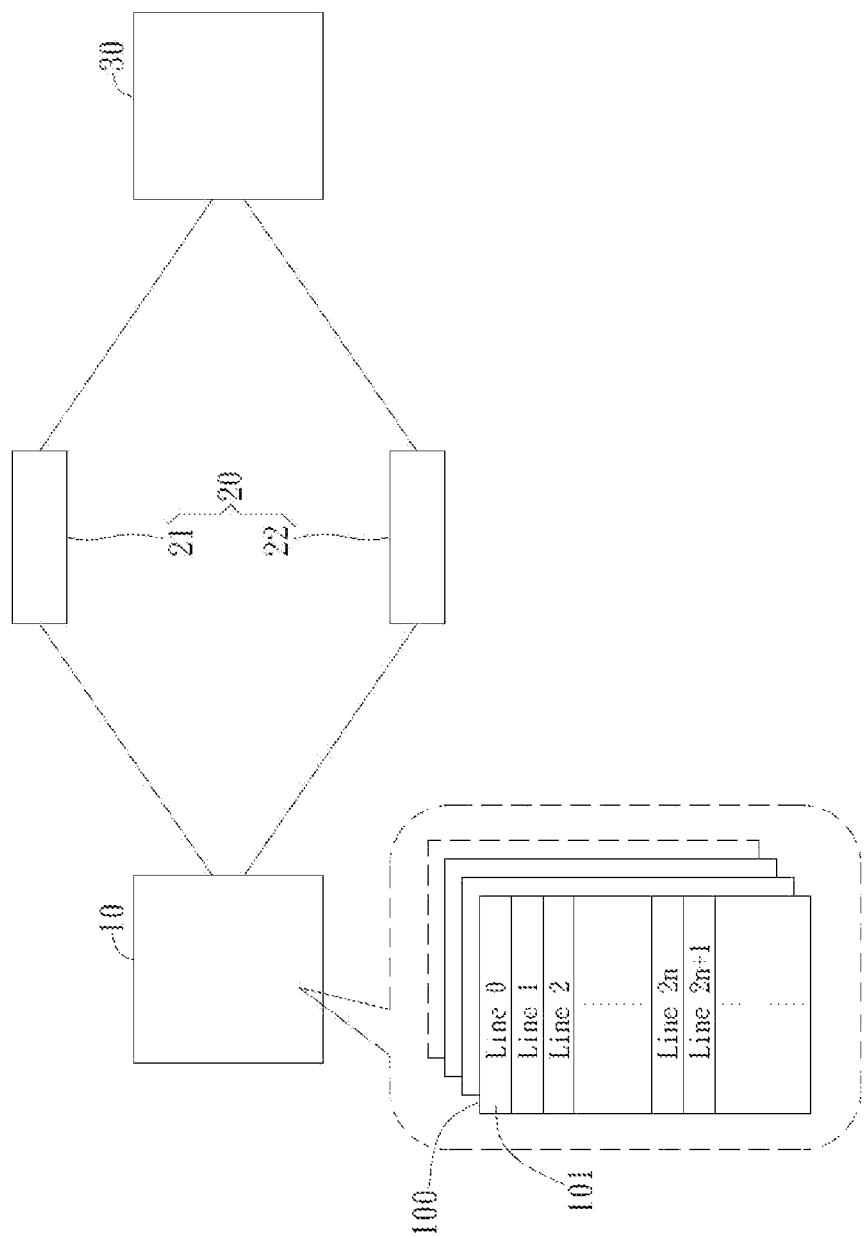
FIG. 2A is a schematic diagram of the apparatus for temporary storage of image-encoding data of the present invention.
Figure 2B:
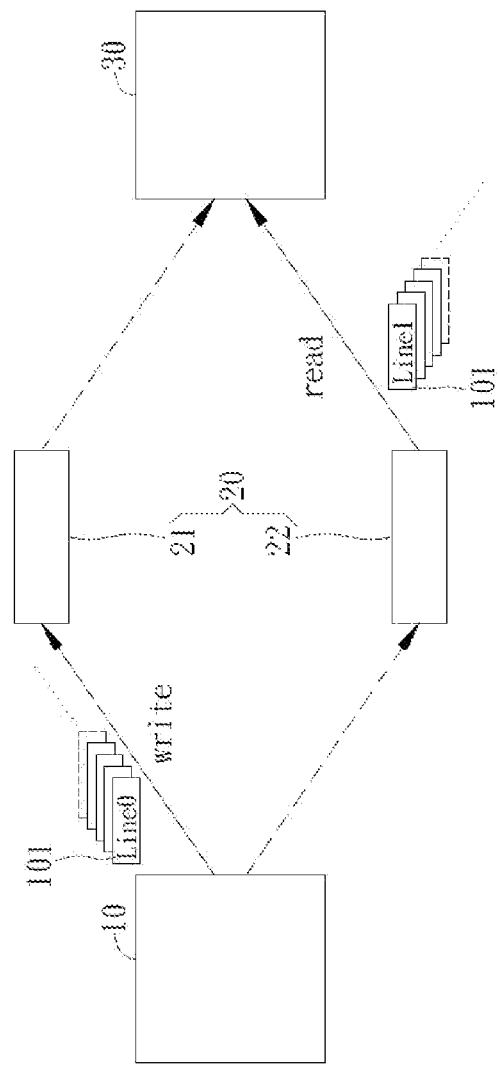
FIG. 2B is a schematic diagram of an embodiment of reading from and writing into the storage unit of the apparatus for temporary storage of image-encoding data of FIG. 2A.
Figure 2C:
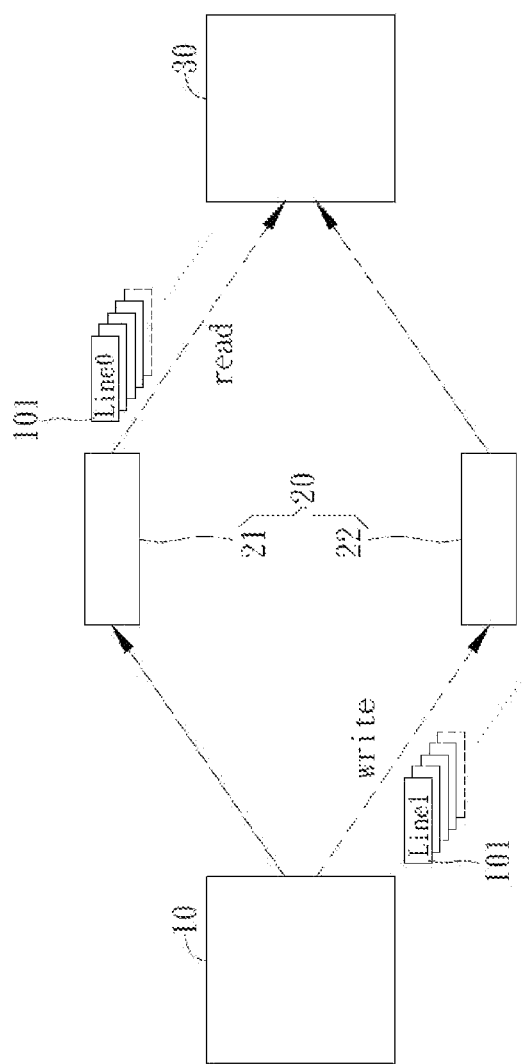
FIG. 2C is a schematic diagram of another embodiment of reading from and writing into the storage unit of the apparatus for temporary storage of image-encoding data of FIG. 2A.

A schematic diagram of the apparatus for temporary storage of image-encoding data of the present invention is illustrated in FIG. 2A. In the present embodiment, the apparatus for temporary storage of image-encoding data is provided for high resolution image encoding and implemented with a form of image-encoding integrated circuit. However, in other embodiments, the apparatus of temporary storage of image-encoding data may be utilized for non high-resolution image encoding and may also be realized in other forms of electronic circuits. As shown in FIG. 2A, the apparatus for temporary storage of image-encoding data includes an image sensing unit 10, a storage unit 20, and an encoding unit 30. The image sensing unit 10 detects images and creates a plurality of frame data 100 in successive order. Each frame data 100 is composed of a plurality of macroblock row data 101. Macroblock row data 101 may have a size of 16 pixel rows or 32 pixel rows. In the present embodiment, the storage unit 20 includes a first storage portion 21 and a second storage portion 22. However, in other embodiments, the storage unit 20 may consist of three or more storage portions. The storage unit 20 can receive macroblock row data 101 from the image sensing unit 10 and then write the macroblock row data 101 into one of the first storage portion 21 and the second storage portion 22. In the present embodiment, even numbered macroblock row data (ex. Line 0, Line 2, Line 4, . . . ) are written into the first storage portion 21 while odd numbered macroblock row data (ex. Line 1, Line 3, Line 5, . . . ) are written into the second storage portion 22. As shown in FIG. 2B, when even numbered macroblock row data 101 are written into the first storage portion 21, odd numbered macroblock 101 may be simultaneously read from the second storage portion 22. As shown in FIG. 2C, when odd numbered macroblock row data 101 are written into the second storage portion 22, even numbered macroblock row data 101 may be simultaneously read from the first storage portion 21.

However, in other embodiments, other methods may be utilized to write macroblock row data into the first storage portion 21 and the second storage portion 22. For instance, odd numbered macroblock row data 101 may be written into the first storage portion 21 while even numbered macroblock row data 101 may be written into the second storage portion 22. In addition, due to the fact that digital image encoding technology conventionally use macroblock row data as a unit basis, the present embodiment makes it more convenient for the encoding unit 30 to encode the macroblock row data 101 read from storage unit 20 since the capacities of the first storage portion 21 and the second storage portion 22 are identical to the size of the macroblock row data 101. However, in other embodiments, the capacities of the first storage portion 21 and the second storage portion 22 may vary accordingly in size to a positive integral multiple of the size of macroblock row data 101 in order to allow the image sensing unit 10 and the encoding unit 30 to be able to simultaneously read and write a plurality of macroblock row data 101.

As shown in FIG. 2A, the encoding unit 30 can read the written macroblock row data 101 from one of the first storage portion 21 and the second storage portion 22 of the storage unit 20. When the encoding unit 30 reads the macroblock row data 101 from one of the first storage portion 21 and the second storage portion 22 of storage unit 20, the storage unit 20 continues to receive and write new macroblock row data 101 from the image sensing unit 10 to the other one of the first storage portion 21 and the second storage portion 22. In other words, the image sensing unit 10 and the encoding unit 30 alternatively write into or read from the first storage portion 21 and the second storage portion 22. The present invention utilizes a design where the capacities of the first storage portion 21 and the second storage portion 22 are identical to the size of macroblock row data in order to achieve the effect of conserving storage space. In addition, the apparatus for temporary storage of image-encoding data of the present invention is applicable to any type of digital encoding technology, such as H.264.

Since the encoding unit 30 reads and encodes macroblock row data 101 from the storage unit 20, in the preferred embodiment, the speed that the encoding unit 30 reads macroblock row data 101 should be no smaller than the speed that the storage unit 20 writes in macroblock row data 101. Additionally, the time required for the encoding unit 30 to read and encode the macroblock row data 101 read from the storage unit 20 should be smaller or equal to the time required for the storage unit 20 to write in the macroblock row data in order to prevent wait times between the image sensing unit 10 and the encoding unit 30 from occurring, and thus allowing continuous operations of alternating reading and writing of the first storage portion 21 and the second storage portion 22.

Figure 3:
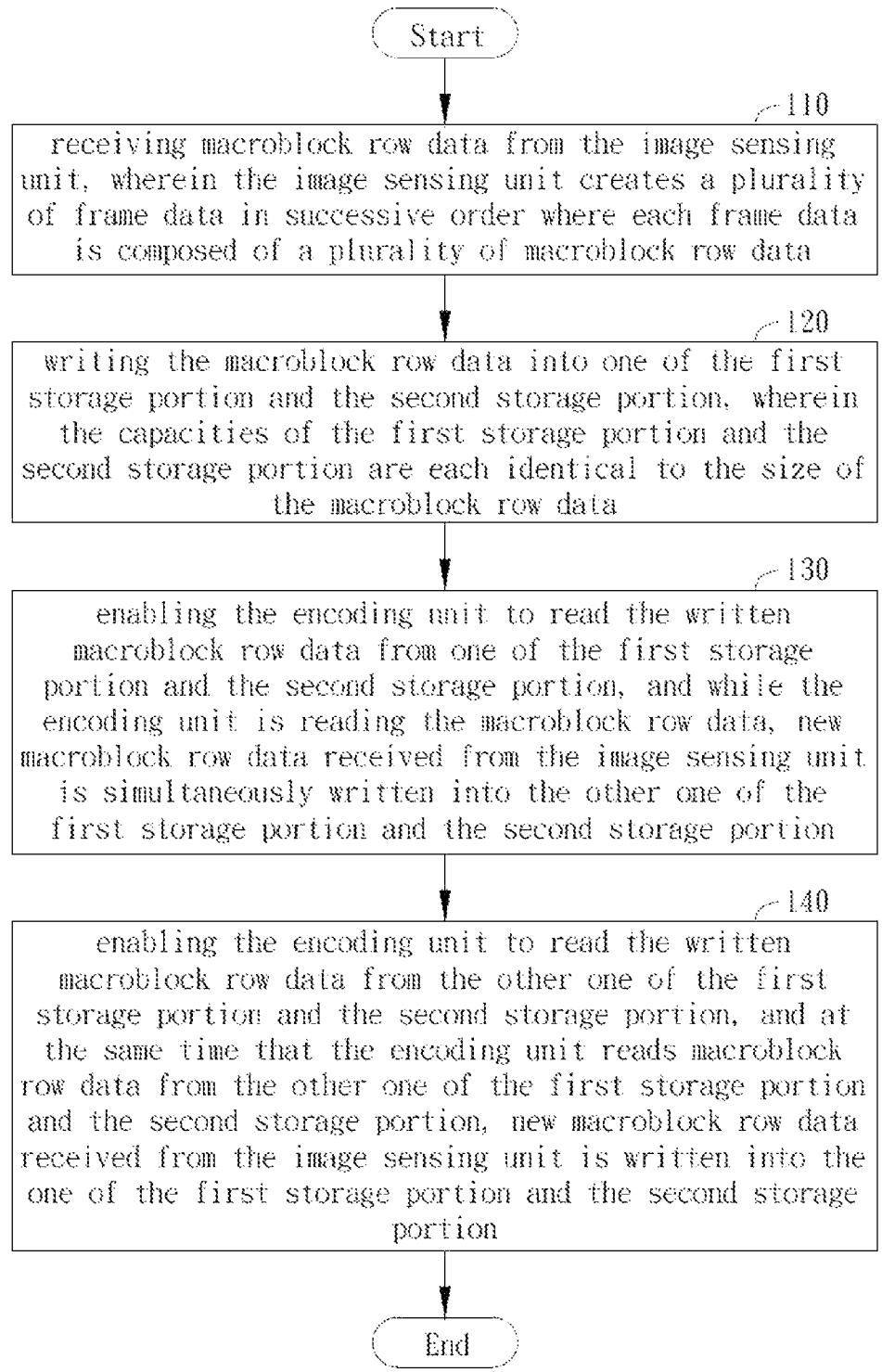
FIG. 3 is a flowchart diagram of the method for temporary storage of image-encoding data of the present invention.

FIG. 3 illustrates a flowchart of the method for temporary storage of image-encoding data of the present invention. The method for temporary storage of image-encoding data of the present invention is applicable for use in high resolution image encoding and applied to the apparatus of temporary storage of image-encoding data that includes an image sensing unit, a storage unit, and an encoding unit, wherein the storage unit consists of a first storage portion and a second storage portion (refer to the embodiment in FIG. 2). As shown in FIG. 3A, the method for temporary storage of image-encoding data includes the steps 110, 120, 130, and 140. Step 110 involves receiving macroblock row data from the image sensing unit, wherein the image sensing unit creates a plurality of frame data in successive order where each frame data is composed of a plurality of macroblock row data. The macroblock row data may have a unit basis of 16 pixel rows or 32 pixel rows. Step 120 involves writing the macroblock row data into one of the first storage portion and the second storage portion, wherein the capacities of the first storage portion and the second storage portion are each identical to the size of the macroblock row data. In the present embodiment, even numbered macroblock row data (ex. Line 0, Line 2, Line 4, . . . ) are written into the first storage portion while odd numbered macroblock row data (ex. Line 1, Line 3, Line 5, . . . ) are written into the second storage portion. In other embodiments, the capacities of the first storage portion and the second storage portion may coincide with a size that is a positive integral multiple of the size of the macroblock row data, so that the image sensing unit and the encoding unit can simultaneously read and write multiple macroblock row data.

Step 130 involves the encoding unit reading the written macroblock row data from one of the first storage portion and the second storage portion, and while the encoding unit is reading the macroblock row data, new macroblock row data received from the image sensing unit is simultaneously written into the other one of the first storage portion and the second storage portion. Step 140 involves the encoding unit reading the written macroblock row data from the other one of the first storage portion and the second storage portion, and at the same time that the encoding unit reads macroblock row data from the other one of the first storage portion and the second storage portion, new macroblock row data received from the image sensing unit is written into the one of the first storage portion and the second storage portion. In other words, step 130 and step 140 are operation steps for the image sensing unit and the encoding unit to alternate reading and writing between the first storage portion and the second storage portion. The method for temporary storage of image-encoding data of the present invention utilizes storage portions having macroblock row data sized storage capacity (e.g. the first storage portion and the second storage portion) as a way to achieve the effect of conserving storage space. In addition, the present invention is applicable to any type of encoding of technology, such as H.264.

Since the encoding unit will encode the macroblock row data retrieved from the storage unit, in the preferred embodiment, to prevent wait times between the image sensing unit and the encoding unit and to allow continuous operations of alternating reading and writing of the first storage portion and the second storage portion, the speed that the encoding unit reads in the macroblock row data may be restricted in step 130 and step 140 to be equal or no smaller than the speed that the storage unit writes in the macroblock row data. Namely, the time required for the encoding unit to read and encode the macroblock row data from the storage unit should be smaller or equal to the time required for the storage unit to write in macroblock row data.

Although the preferred embodiments of the present invention have been described herein, the above description is merely illustrative. Further modifications of the invention herein disclosed will occur to those skilled in the respective arts and all such modifications are deemed to be within the scope of the invention as defined by the appended claims.

What is claimed is:

1. An apparatus for temporary storage of high resolution image-encoding data, comprising:
   an image sensing unit for creating a plurality of frame data in successive order, wherein each frame data is composed of a plurality of macroblock row data;
   a storage unit comprising at least two storage portions, the storage unit receiving from the image sensor unit the individual macroblock row data and writing the macroblock row data into one of the storage portions, wherein the smallest capacity of the storage unit is equal to two macroblock row data and each of the storage portions have storage capacities proportional to a positive integral multiple of the size of the macroblock row data; and
   an encoding unit for reading and encoding the written macroblock row data from one of the storage portions of the storage unit on a one-macroblock row data basis as the storage unit simultaneously continuously receiving from the image sensing unit another macroblock row data and writing the received macroblock row data into another one of the storage portions of the storage unit, wherein the speed for the encoding unit to read and encode the macroblock row data from the storage unit is no smaller than the speed for the storage unit to write in the macroblock row data.

2. The apparatus for temporary storage of high resolution image-encoding data of claim 1, wherein the speed for the encoding unit to read and encode the macroblock row data is equal to the speed for the storage unit to write in the macroblock row data.

3. An image-encoding integrated circuit, comprising the apparatus of temporary storage of high resolution image-encoding data in claim 1.

4. The apparatus for temporary storage of high resolution image-encoding data of claim 1, wherein each of the storage portions has the storage capacity identical to the size of the macroblock row data.

5. The apparatus for temporary storage of high resolution image-encoding data of claim 1, wherein even numbered macroblock row data are written into one of the at least two storage portions of the storage unit, and odd numbered macroblock row data are written into another one of the at least two storage portions of the storage unit.

6. A method for temporary storage of high resolution image-encoding data, comprising:
   reading a macroblock row data from an image sensing unit, wherein the image sensing unit creates successive multiples of frame data and each individual frame data is composed of multiple macroblock row data;
   writing the macroblock row data into one of a first storage portion and a second storage portion of a storage unit, wherein the smallest capacity of the storage unit is equal to two macroblock row data, and the storage capacities of the first storage portion and the second storage portion are proportional to a positive integral multiple of the size of the macroblock row data;
   enabling an encoding unit to read and encode the written macroblock row data from the one of the first storage portion and the second storage portion on a one-macroblock row data basis; and
   enabling the storage unit simultaneously to write new macroblock row data into the other one of the first storage portion and the second storage portion of the storage unit as the encoding unit is reading and encoding the written macroblock row data from the one of the first storage portion and the second storage portion, wherein the steps of enabling the storage unit to write the macroblock row data and the encoding unit to read and encode the macroblock row data are repeated in an alternative turn for the first storage portion and the second storage portion; wherein the encoding unit reads and encodes the macroblock row data from the first storage portion or the second storage portion with a speed no slower than a speed for the storage unit to write in the macroblock row data.

7. The method for temporary storage of high resolution image-encoding data of claim 6, further comprising enabling the encoding unit to read and encode the macroblock row data with a speed equal to a speed for the storage unit to write the macroblock row data.

8. The method for temporary storage of high resolution image-encoding data of claim 6, further comprising enabling the encoding unit to read and encode the written macroblock row data from the other one of the first storage portion and the second storage portion, and as the encoding unit is reading and encoding the written macroblock row data, the storage unit simultaneously receives new macroblock row data from the image sensing unit and writes the new macroblock row data into the one of the first storage portion and second storage portion.

* * * * *